Aug. 28, 1956  G. H. MULLER  2,760,787
INDEPENDENT FRONT WHEEL SUSPENSION FOR MOTOR VEHICLE
Filed Feb. 7, 1955  2 Sheets-Sheet 1
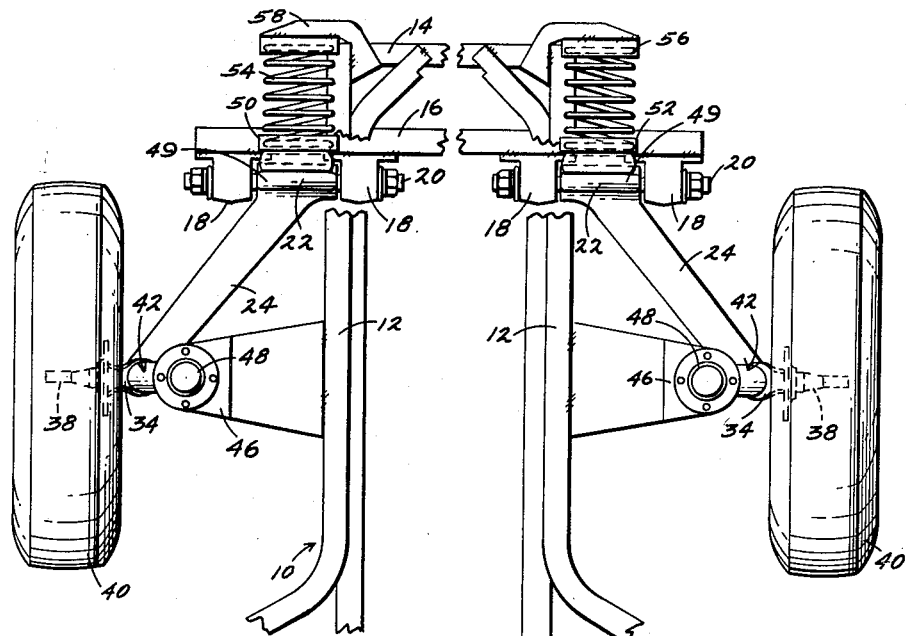
Fig.1
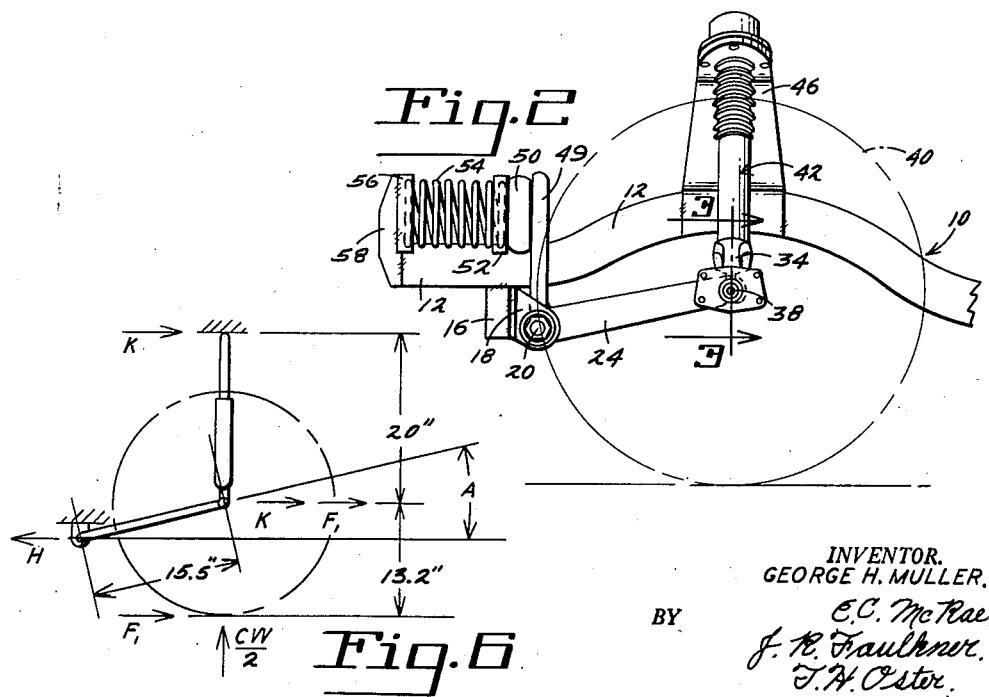
Fig.2
Fig.6
INVENTOR.
GEORGE H. MULLER.
BY E.C. McRae.
J. R. Faulkner.
T. H. Oster.
ATTY's.

Aug. 28, 1956  G. H. MULLER  2,760,787
INDEPENDENT FRONT WHEEL SUSPENSION FOR MOTOR VEHICLE
Filed Feb. 7, 1955  2 Sheets-Sheet 2
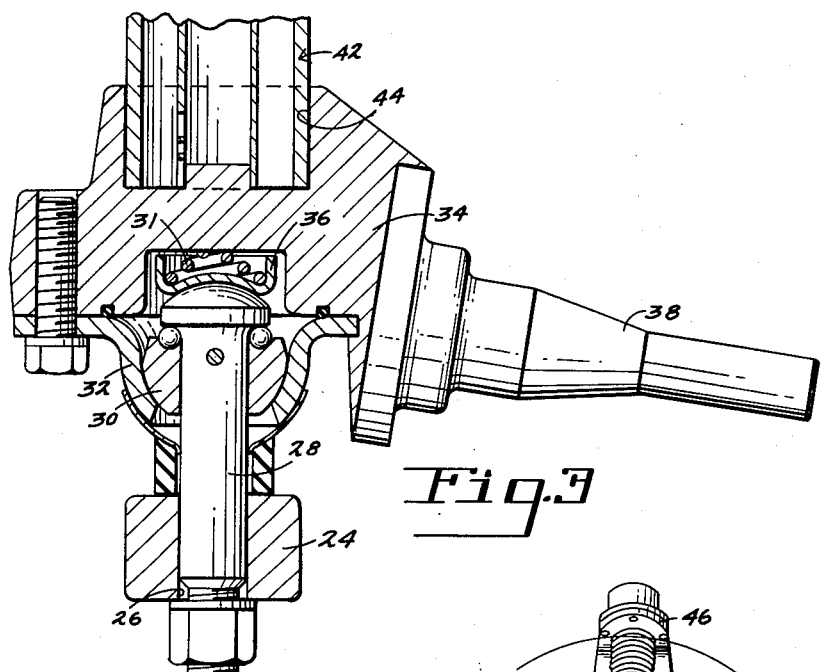
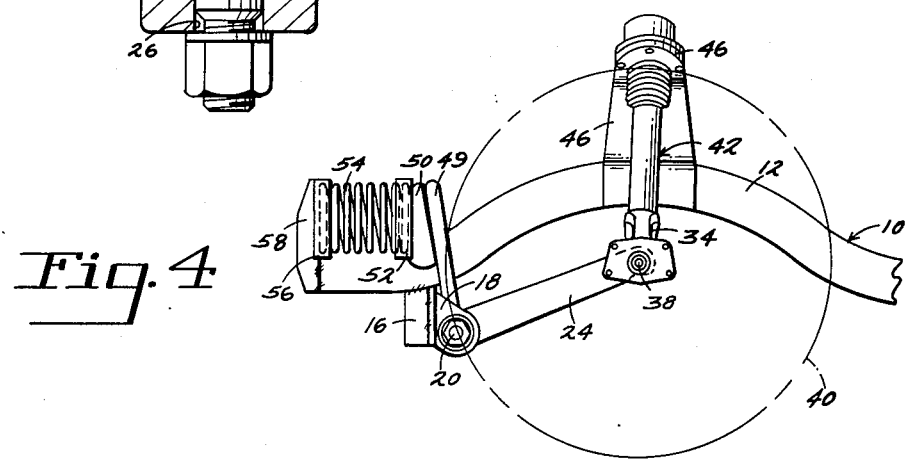
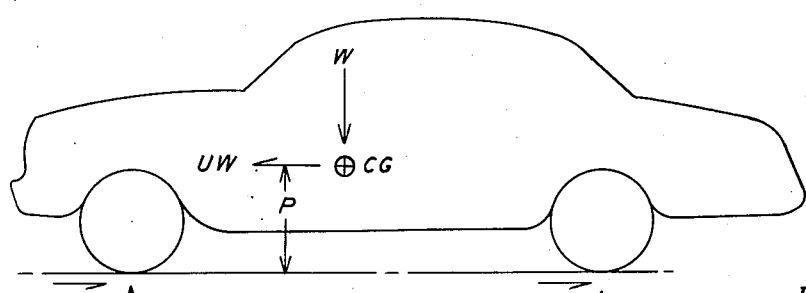
INVENTOR.
GEORGE H. MULLER.
BY E. C. McRae.
J. R. Faulkner.
J. H. Oster.
ATTYS.

United States Patent Office 2,760,787
Patented Aug. 28, 1956

2,760,787

INDEPENDENT FRONT WHEEL SUSPENSION FOR MOTOR VEHICLE

George H. Muller, Northville, Mich., assignor to Ford Motor Company, Dearborn, Mich., a corporation of Delaware Application February 7, 1955, Serial No. 486,497

4 Claims. (Cl. 280—124)

This invention relates generally to an independent wheel suspension for a motor vehicle, and has particular reference to an independent suspension for the front wheels of a motor vehicle incorporating trailing suspension arms.

In an embodiment of the present invention, a trailing suspension arm is provided for each of the front road wheels, being pivotally mounted upon the vehicle frame for rotation about a common transverse horizontal axis. The trailing suspension arms are inclined upwardly in a rearward direction from their pivotal axis, and are connected at their rearward ends by ball joints to a generally vertically extending shock absorber, the shock absorber being connected at its upper end to the vehicle frame and being so constructed as to function not only as a shock absorber but also as a telescopic control member assisting in supporting and guiding the road wheels.

The geometry of the trailing suspension arm and the shock absorber and their connections to the vehicle frame and the road wheels are such as to provide an anti-dive brake feature, and may be arranged if desired to afford 100% anti-brake dive.

In one form of the construction, a horizontal suspension coil spring is provided between a frame bracket and a member carried by and extending upwardly from the trailing suspension arm, with a rubber block working in compression and shears being provided between the arm and the spring to provide an increasing spring rate as the arm swings from its normal position during a compression stroke.

In addition to the foregoing features, the independent front wheel suspension of the present invention provides a light weight and low cost suspension providing a ball joint arrangement to facilitate steering, greater clearance for engine and steering components, constant camber, as well as improved general performance as a suspension.

Other objects and advantages of this invention will be made more apparent as this description proceeds, particularly when considered in connection with the accompanying drawings, wherein:

Figure 1 is a fragmentary plan view of the forward portion of a motor vehicle chassis incorporating an independent front wheel suspension constructed according to the present invention.

Figure 2 is a side elevational view of the construction shown in Figure 1.

Figure 3 is an enlarged cross sectional view taken on the plane indicated by the line 3—3 of Figure 2.

Figure 4 is a side elevational view similar to Figure 2 but showing the suspension during jounce.

Figure 5 is a schematic view illustrating the forces upon the vehicle.

Figure 6 is a schematic view illustrating the forces upon the front wheel suspension system.

Referring now to the drawings, and particularly to Figures 1 to 4 inclusive, the reference character 10 indicates generally a motor vehicle frame having side frame rails 12 of generally box section interconnected at their forward ends by a front cross frame member 14. Rearwardly of the front cross frame member 14 is a second cross frame member 16 extending beneath the side rails 12 and secured thereto as by welding. The cross frame member 16 extends outwardly beyond the opposite side frame rails 12, and supports at each side thereof a pair of brackets 18 forming bearing supports for cross shafts 20 journaled therein.

The cross shafts 20 are axially aligned with each other and extend transversely of the vehicle frame with their axes horizontal. Each shaft 20 pivotally supports the hub 22 of a trailing suspension arm 24. The trailing arms 24 are flared outwardly from the side frame rails 12 and are also inclined upwardly in a rearward direction, with the inclination being predetermined in a manner hereinafter described to provide anti-brake dive for the suspension.

As best seen in Figure 3, the rearward end of each trailing suspension arm 24 is provided with a vertical bore 26 receiving a stud 28 carrying at its upper end a sectional ball 30, with the latter being received within a spherical socket 32 bolted to the spindle support 34. A retainer 36 and preloaded spring 31 secure components of the ball joint 30 in assembled relationship. It will be understood that any suitable type of conventional ball joint may be used to provide a universal connection between the rearward end of the trailing arm 24 and the spindle support 34.

Formed integrally with the spindle support 34 is a laterally outwardly projecting spindle portion 38 rotatably supporting a front road wheel 40 in the conventional manner.

A combined hydraulic shock absorber and telescopic control member 42 is provided, and may be of any suitable type, such as for example the type shown in the patent application, Serial No. 479,181, filed December 31, 1954, in the names of John G. McQuaid and George H. Muller, entitled "Shock Absorber," and having a common assignee with the present application. At its lower end the telescopic shock absorber 42 is received within a socket formed in the upper portion of the wheel spindle 34, being suitably secured therein. At its upper end the telescopic shock absorber 42 is secured to a frame bracket 46 extending upwardly and outwardly from the side frame rail 12 and forming a rigid support for the shock absorber. The connection between the upper end of the shock absorber 42 and the frame bracket 46 may comprise a resilient rubber mount 48 to lessen noise transfer from the road wheel to the frame and also to accommodate slight angular movements of the telescopic shock absorber as the road wheel rises and falls relative to the frame.

Referring now particularly to Figures 1 and 2, the trailing suspension arm 24 is provided with an integral vertical flange 49 extending upwardly from the hub portion 22 of the suspension arm. The vertical flange 49 of the suspension arm acts through a resilient rubber block 50 and a spring retainer 52 upon the rearward end of a coil spring 54, the forward end of which is supported in a spring retainer 56 carried by a frame bracket 58 welded to the vehicle frame at the junction between the forward end of the side frame rail 12 and the front cross frame member 14.

It will be seen that rising and falling movements of the road wheel 40 result in angular movement of the vertical flange 49 of the trailing suspension arm 24 about its pivot shaft 20, with the vertical flange acting against the suspension coil spring 54. Referring now to Figure 4, it will be noted that as the flange 49 swings from the vertical during a compression stroke resulting from wheel jounce, the rubber block 50 is distorted and in addition the effective lever arm through the rubber block to the coil spring 54 changes to provide an increasing spring rate with accompanying desirable improvements in the ride characteristics.

The geometry of the independent front wheel suspension described above provides anti-brake dive control, and in fact may be so proportioned as to provide substantially 100% anti-brake dive. Braking forces result in a rearward horizontal reaction at the ball joint connection 30 between the rearward end of the trailing suspension arm 24 and the lower end of the vertical telescopic shock absorber 42. Due to the inclination of the trailing suspension arm 24 in a rearward upward direction from its pivot shaft 20, this reaction divides itself into a component in alignment with the inclined suspension arm 24 and a second component at right angles thereto in an upward direction to resist brake dive tendencies inherent in most vehicles under braking conditions.

The forces involved are briefly analyzed as follows, with particular reference to figures 5 and 6.

Figure 5 schematically shows the forces upon the vehicle during braking, where:

$u = .8$
$W = 4,300$ lbs.—Complete weight of car plus passengers.
$RF$ = static reaction on front wheels—2260.
$RR$ = static reaction on rear wheels—2040.
$uW$ = inertia force at C. G. due to braking.
$CW$ = change in reaction on wheels due to load transfer at braking.
$F_1$ = friction force as brakes are applied (front).
$F_2$ = friction force as brakes are applied (rear).
$b = 115$ inches.
$p = 25$ inches.

Using the figures mentioned above, which are for a typical motor vehicle of the passenger type, it will be seen that the moments about the front road wheel 40 are.

$$(uW)(p) = (CW)(b)$$
$$CW = \frac{(uW)(p)}{b} = \frac{(.8)(4300)(25)}{115} = 748 \text{ lbs.}$$

The above calculation determines the change in reaction upon the wheels due to load transfer during braking, and will be seen that the change in reaction upon each front wheel will be one-half of 748 pounds, or 374 pounds.

The friction force upon each front wheel during braking may be calculated as follows:

$$F_1 = (u)\left(\frac{RF + CW}{2}\right) = (.8)\left(\frac{2260 + 748}{2}\right) = 1203 \text{ lbs.}$$

Referring now particularly to the schematic view and force diagram shown in Figure 6, it will be seen that the shock absorber 42 takes no vertical load and only absorbs the moment of $(F_1)$ $(13.2)$, then:

$$(K)(20) = (F_1)(13.2) = (1203)(13.2)$$
$$K = 795 \text{ lbs.}$$
$$H = F_1 + K = 1998 \text{ lbs.}$$

To vary the amount of anti-brake dive performance the inclination of the trailing suspension arm 24 with respect to the horizontal may be varied. To obtain 100% anti-brake dive, the angle A between the suspension arm and the horizontal may be determined as follows, with the moments about the axis 20 of the trailing arm 24 balanced.

$$(K + F_1)(15.5 \sin A) + (20)(K) = \left(\frac{CW}{2}\right)$$
$$(15.5 \cos A) + (13.2)(F_1)$$
$$(1998)(15.5 \sin A) + (20)(795) = (374)$$
$$(15.5 \cos A) + (13.2)(1203)$$
$$A = 10.4° \text{ for } 100\% \text{ anti-dive}$$

It will be seen that the above described independent variable rate front wheel suspension is relatively simple and inexpensive to manufacture, and provides a geometry achieving constant camber and anti-brake dive control. In addition, the suspension provides a ball joint between the trailing suspension arm and the telescopic shock absorber to facilitate steering, and achieves a compact system providing greater clearance for engine and steering components.

It will be understood that the invention is not to be limited to the exact construction shown and described, but that various changes and modifications may be made without departing from the spirit and scope of the invention, as defined in the appended claims.

What is claimed is:

1. In an independent wheel suspension for the front road wheels of a motor vehicle, a frame, a pair of suspension members journaled upon the forward portion of said frame for rotation about a common transversely extending horizontal axis, said suspension members having trailing arm portions extending rearwardly from said axis on the outboard side of said frame, a pair of generally vertically extending telescopic shock absorbers at opposite sides of said frame connected at their upper ends to said frame, spindle supports secured to the lower ends of said shock absorbers and rotatably supporting said road wheels, and ball joint connections between said spindle supports and the rearward ends of the trailing arms of said suspension members arranged so that said trailing arms are inclined upwardly in a rearward direction from said axis.

2. The structure defined by claim 1 which is further characterized in that each of said suspension members is pivotally supported upon the transversely extending cross frame member carried by said vehicle frame adjacent the forward end thereof, said suspension member having an integral lever arm extending generally upwardly from the pivotal axis between said suspension member and said cross frame member, and a generally horizontally extending suspension coil spring having its forward end anchored to said vehicle frame and its rearward end operatively engaged by the upwardly extending lever arm of said suspension member.

3. The structure defined by claim 2 which is further characterized in that a resilient block of rubber is placed between the upwardly extending lever arm and the rearward end of said suspension coil spring, said rubber block being distortable as said lever arm swings in response to rising and falling movements of said road wheel relative to said frame, the angular movement of said lever arm changing the effective length of said lever arm and providing a variable spring rate depending upon the angular movement of said arm.

4. In an independent wheel suspension for the front road wheels of a motor vehicle, a pair of side frame rails, a transversely extending cross frame member adjacent the forward ends of said frame rails, brackets carried by said cross frame member, a pivot shaft at each side of said vehicle journaled in said brackets, a suspension member supported by each pivot shaft and having a trailing arm portion extending rearwardly therefrom with said trailing arm portion diverging outwardly with respect to said frame side rail, a spindle support rotatably mounting each of said front road wheels, a ball joint connection between the rearward end of the trailing arm portion of each suspension member and the adjacent spindle support, a frame bracket secured to each of said frame side rails and extending upwardly and outwardly therefrom, and a telescopic hydraulic shock absorber at each side of said vehicle having its upper end connected to said frame bracket and its lower end connected to said spindle support, each of said trailing arm portions of said suspension members being inclined upwardly in a rearward direction to provide an anti-brake dive force component.

References Cited in the file of this patent

UNITED STATES PATENTS

| | | |
|---|---|---|
| 2,080,546 | Rudoni | May 18, 1937 |
| 2,624,592 | MacPherson | Jan. 6, 1953 |